United States Patent [19]

Kitamura et al.

[11] 4,105,838

[45] Aug. 8, 1978

[54] METHOD FOR THE POLYMERIZATION OF VINYL CHLORIDE

[75] Inventors: Hajime Kitamura; Toshihide Shimizu, both of Joetsu, Japan

[73] Assignee: Shin-Etsu Chemical Co., Ltd., Japan

[21] Appl. No.: 626,328

[22] Filed: Oct. 28, 1975

[30] Foreign Application Priority Data

Oct. 31, 1974 [JP] Japan .................... 49/125976

[51] Int. Cl.² ............................ C08F 14/06
[52] U.S. Cl. ...................... 526/62; 526/74; 526/344
[58] Field of Search ............... 526/62, 74

[56] References Cited

U.S. PATENT DOCUMENTS

| | | |
|---|---|---|
| 3,515,709 | 6/1970 | Nelson et al. ............ 526/62 |
| 3,669,946 | 6/1972 | Koyanagi et al. ......... 526/62 |
| 3,778,423 | 12/1973 | Reiter .................. 526/62 |
| 3,915,944 | 10/1975 | Burgess et al. .......... 526/62 |
| 3,959,235 | 5/1976 | Nishigaki et al. ........ 526/74 |
| 4,007,320 | 2/1977 | Petersen ................ 526/62 |

*Primary Examiner*—Alan Holler
*Attorney, Agent, or Firm*—McGlew and Tuttle

[57] ABSTRACT

Vinyl chloride monomer or a monomeric mixture composed mainly of vinyl chloride is polymerized in a polymerization vessel having its inner walls and the surfaces of an agitator and other equipment attached thereto coming into contact with the monomer or monomers coated with a metal complex of a polar organic compound and/or an organic dye. This method of polymerization serves to greatly reduce the deposition of polymer scale on those surfaces and produce high quality polymer.

20 Claims, No Drawings

METHOD FOR THE POLYMERIZATION OF VINYL CHLORIDE

FIELD OF THE INVENTION

This invention relates to an improvement for polymerization of vinyl chloride or a monomeric mixture composed mainly of vinyl chloride, whereby the deposition of polymer scale on the inner walls of a polymerization vessel and the surfaces of an agitator and other equipment attached thereto coming into contact with the monomer or monomers can be effectively prevented.

DESCRIPTION OF THE PRIOR ART

As methods for producing vinyl chloride polymer, there are known various methods, i.e., by suspension polymerization, emulsion polymerization, solution polymerization, gas-phase polymerization and bulk polymerization. These polymerization methods have a defect that polymer scale deposits on the inner walls of the polymerization vessel and the surfaces of various equipment attached to the polymerization vessel including agitator blades, resulting in the reduction of the yield of polymer product and the cooling efficiency in the polymerization vessel. Further, the scale once deposited on the various surfaces tend to come off and enter into polymer product, resulting in the lowering of its quality. Furthermore, the scale deposited has to be removed following each polymerization run with a great deal of labor and time, resulting in the reduction of productivity. Besides, the scale-removing operation involves a health problem in view of a carcinogenic property possessed by monomeric vinyl chloride.

In order to prevent such unwanted polymer scale deposition on the inner walls of the polymerization vessel and the other surfaces, there have been proposed to coat those surfaces with an amine compound, a quinone compound, an aldehyde compound or other polar organic compound (see Japanese Patent Publications No. 30343/70, No. 30835/70 and No. 4753/71 and British patent specification No. 1291145). However, the effectiveness of this method is limited only to application to suspension polymerization; no substantial effect can be obtained when applied to other polymerization techniques. Further, in the suspension polymerization with the above-described coating, only the homopolymerization of vinyl chloride monomer is available for maintaining the effect to prevent polymer scale formation through a considerable long repetition of polymerization runs. Furthermore, generally in the copolymerization of vinyl chloride monomer with another monomer or monomers or any polymerization using an emulsifier, the effect of the prevention of polymer scale formation can be maintained for only a short repetition of polymerization runs.

OBJECTS OF THE INVENTION

It is therefore a primary object of the present invention to provide a method for the polymerization of vinyl chloride or a monomeric mixture composed mainly of vinyl chloride, according to which the deposition of polymer scale on the inner walls of a polymerization vessel and other surfaces in contact with the monomer can be substantially prevented in all types of polymerization and copolymerization.

Another object of the present invention is to provide a method for the polymerization of vinyl chloride or a monomeric mixture composed mainly of vinyl chloride, according to which the productivity of a polymerization vessel used can be improved.

Still another object of the present invention is to provide a method for the polymerization of vinyl chloride or a monomeric mixture composed mainly of vinyl chloride, according to which high quality vinyl chloride polymer can readily be produced.

SUMMARY OF THE INVENTION

According to the method of the present invention, the above objects can be attained by using a polymerization vessel, in which layers of a metal complex of a polar organic compound and/or an organic dye are formed on the inner walls of the polymerization vessel and the surfaces of an agitator and other equipment attached thereto coming into contact with monomer or a monomeric mixture.

DETAILED DESCRIPTION OF THE INVENTION

The inventors of the present invention made researches with a view to developing any techniques that might be effective to prevent the unwanted polymer scale formation in the polymerization of vinyl chloride monomer or a mixture thereof with a copolymerizable monomer or monomers. During the course of the researches, they came to find that the deposition of scale on the inner walls of the polymerization vessel and the surfaces of equipment attached thereto was closely concerned, for example, in polymerization in aqueous medium, with the potential of a single electrode between the metal surface of the polymerization wall or the various equipment and the aqueous medium, and further that the potential of larger values were capable of contributing to the reduction of scale formation to greater degrees. The larger potentials of the single electrode could be attained by application of the known coatings of a polar organic compound like a amine compound etc. mentioned hereinbefore on the inner walls of the polymerization vessel etc., but this was not successful when any monomer or monomers other than vinyl chloride, such as, vinyl acetate and a methacrylic acid ester, were present in large quantities or when an anionic surface active agent or an organic or inorganic acid was present in the polymerization medium. To solve these questions, the inventors have continued further investigations, to finally discover that the large potentials could be obtained and maintained without adverse effects if the coating of any one or more polar organic compounds should be blended with a certain metal complex, and that such coatings should be effectively applicable to homopolymerization or copolymerization of any types, including suspension, emulsion, solution, bulk and gas-phase techniques. This discovery is the basis of the present invention.

In accordance with the method of the present invention, a variety of metal complexes of organic polar compounds and/or organic dyes can be used. Such metal complex is prepared, for example, by dissolving or dispersing a polar organic compound and/or an organic dye in an appropriate organic solvent, adding to the solution or dispersion a metal salt, such as, chloride, nitrate and acetate, that are capable of forming a metal complex with the polar organic compound and/or the organic dye, and allowing the resulting mixture at a temperature above room temperature for a certain period of time for aging. It is added that the aging time is of considerable importance and recommended to be longer than 10 minutes at, for example, 40° C in order to have the polymerization runs repeated sufficiently many times without polymer scale formation. The metal complex of the polar organic compound and/or the organic dye is, as is or in the form of further dilution with a suitable solvent, applied over the inner walls of the polymerization vessel, the surfaces of an agitator and other attachments coming into contact with the monomer or the monomeric mixture to form thin layers.

According to an alternative embodiment of the present invention, the formation of the metal complex layers is accomplished by the method in which the complex is formed in situ on the walls of the polymerization vessel and other surfaces coming into contact with the monomer or the monomeric mixture by coating those surfaces with a solution or dispersion of the polar organic compound and/or the organic dye in a suitable solvent, followed by the treatment with a metal salt dissolved or dispersed in the water, monomer or monomeric mixture to be used in the subsequent polymerization process.

Illustrative of the polar organic compounds useful for the method of the present invention are (1) nitrogen-containing organic compounds selected from compounds having an azo, nitro, nitroso or azomethine group or an azine ring, and amine, amide and nitrile compounds, such as, azomethane, azobenzene, nitrobenzene, nitrosobenzene, monoaminomononitroazobenzene, pyrazine, pyridine, pyrrole, chlorophyl, thiazine, oxazine, morpholine, quinoline, aniline, benzal aniline, EDTA, α-naphthyl amine, ethanol amine, diethanol amine, phenylenediamine, acetamide, dimethylformamide, acetonitrile, orthophenanthroline, Methylene Blue, Nigrosine, Nigrosine Base, Oil Black, Spirit Black, vitamin $B_2$, polyethyleneimine, polyamide, polyacrylamide, polyacrylonitrile and polyurethane; (2) sulfur-containing organic compounds selected from compounds having a thiocarbonyl, thioether or thiol group, such as, thioglycolic acid, thiourea, thiocarbanilic acid, thiocarbamic acid, thiobenzoic acid, diethyl sulfide, ethyl-methyl sulfide, propyl mercaptan, butyl mercaptan, polysulfide and polysulfone; and (3) oxygen-containing organic compounds selected from quinones, ketones, aldehydes, alcohols, esters, carboxylic acids, sulfoxides and oximes, such as, p-benzoquinone, anthraquinone, benzophenone, acetophenone, diisopropyl ketone, formaldehyde, acetaldehyde, benzaldehyde, octyl alcohol, cetyl alcohol, benzyl alcohol, phenol, cresol, hematein, fluorescein, diisopropyl ether, diphenyl ether, amylacetate, ethyl benzoate, stearic acid, benzoic acid, salicyclic acid, diethyl sulfoxide, formaldoxime, polyacetal, polyacrylic acid, and polyvinyl alcohol.

Illustrative of the organic dyes useful for the method of the present invention are azo dyes, such as, water soluble or dispersed mono-azo, dis-azo, polyazo and azoic dyes, Benzopurpurine 4B, metal-containing azo dyes; anthraquinone dyes, such as, anthraquinone acid dyes, anthraquinone vat dyes, anthrone vat dyes, alizarin dyes and dispersed anthraquinone dyes; indigo dyes, such as, Brilliant Indigo B, Threne Red Violet RH and Threne Printing Black B; sulfide dyes, such as, Sulfur Blue F.B.B. and Sulfur Black B; phthalocyanine dyes including metal-free phthalocyanine dyes, diphenylmethane dyes, triphenylmethane dyes, xanthene dyes, acridine dyes, nitro dyes, nitroso dyes, thiazole dyes, azine dyes, oxazine dyes, thiazine dyes, benzoquinone dyes, naphthoquinone dyes and cyanine dyes.

Further, examples of the metal compounds useful for forming complexes with the above-mentioned polar organic compounds or organic dyes in accordance with the present invention include the following. Cu, Ag, Au, Zn, Cd, Hg, Y, lanthanoid elements, Al, Ti, Zr, Hf, Sn, Pb, V, Nb, Ta, Cr, Mo, W, Mn, Fe, Co, Ni, Rh, Pd, Ir and Pt in the form of chlorides, sulfates, nitrates, acetates and the like.

As the organic solvents that are useful for forming the metal complexes of the present invention, there are mentioned for example alcohols, esters, ketones, hydrocarbons and chlorinated hydrocarbons.

In the formation of the complexes of the present invention, the mixing ratio of the polar organic compound and/or organic dye to the metal compound is within the range of from 100:5 to 100:300, preperably from 100:10 to 100:150 by weight. If the amount of the metal compound used is too small, no sufficient formation of the metal complex could be achieved. If, on the other hand, the metal compound is used too much, various disadvantageous effects would be brought about due to an excess of the metal compound remaining undissolved in the solvent.

The suitable amount of the metal complex of the polar organic compound and/or organic dye to be used to form coating layers on the surfaces of the inner walls of the polymerization vessel, the agitator and other attachments is within the range of from 0.001 to 100 $g/m^2$, preferably from 0.01 to 50 $g/m^2$ for the purpose of sufficiently preventing polymer scale deposition on those surfaces.

In practising the method of the present invention, a small amount of the metal complex may be added to the polymerization mixture. By so doing, the possible dissolution of the complex from the coated surfaces into the polymerization mixture due to the action of the monomer, water or other additives will be effectively suppressed, or, particularly in the case of suspension or emulsion polymerization, the metal complex added will be adsorbed on the surface of monomer droplets so that scale formation may be more effectively prevented. The suitable amount of the metal complex to be added to the polymerization mixture of the purpose is at least several p.p.m. based on the weight of the monomer or monomeric mixture. If the amount is too large, adverse effects would be caused and, therefore, it is preferred not to exceed about 100 p.p.m.

It may be added that when the method of the present invention is practised in the polymerization in aqueous medium, it is preferable that the medium is alkaline.

Further, some of the features of the present invention may be given as follows.

The first of the features is that the method can be applicable for any types of polymerization, i.e., suspension, emulsion, bulk, solution and gas-phase polymerization.

The second of the features is that the method can be applied to not only homopolymerization of vinyl chloride but also copolymerization of vinyl chloride with other monomer or monomers copolymerizable therewith. Incidentally, examples of the copolymerizable monomers include vinyl esters, vinyl ethers, acrylonitrile, acrylic and methacrylic acids, esters thereof, maleic and fumaric acids, esters thereof, maleic anhydride, aromatic vinyl compounds, vinylidene halides and olefins.

The third of the features is that the method can be applicable under any polymerization conditions, that is to say, regardless of the kind of additives to the polymerization mixture, the kind of polymerization initiators, the condition of agitation and the temperature of polymerization.

Now, the present invention is illustrated by reference to the following examples. The single electrode potential expressed by "S.E.P." in the tables accompanying the examples was determined as follows.

A sample electrode of stainless steel was coated with the same metal complex as employed for the polymerization. The value of the potential of the electrode was determined in 1 N hydrochloric acid at 25° C by use of a potentiometer with reference to the standard calomel electrode.

EXAMPLE 1

A solution of a metal complex with an organic compound as indicated in Table I in a mixture of methylene chloride and methanol 1:1 by weight, aged for varied period of time as specified in the same table, was applied over the surfaces of the inner walls of each 1,000-liter stainless steel polymerization vessel and an agitator attached thereto having one paddle blade 600 mm in diameter, the amount of the metal complex as solid being 0.05 g/m². Then, 200 kg of vinyl chloride monomer, 500 kg of pure water, 200 g of partially saponified polyvinyl alcohol and 60 g of dimethyl valeronitrile were charged in the polymerization vessel. Thereupon, the agitator was operated at a velocity of 100 r.p.m. and the temperature was elevated to 57° C, to conduct polymerization for 16 hours. The resulting polymerizate was then withdrawn from the polymerization vessel, subject to renewed and repeated polymerization in the same polymerization vessel and under the same polymerization conditions. After each polymerization run, the surfaces of the inner walls of the polymerization vessel and the agitator were observed by naked eyes to determine whether or not clouding has occurred on those surfaces. In this case, if the occurrence of clouding was witnessed, it meant that polymer scale deposition would take place in the subsequent polymerization run, and the number of polymerization runs repeated thus far was counted and shown in Table I as "No. of Repeated Runs". This No. of Repeated Runs could also be determined by counting the repeated polymerization runs until the amount of scale deposited on the surfaces exceeded 1 g/m². The results of these experiments Nos. 1-20 are set out in Table I.

For comparison, two experiments No. 21 and 22 were conducted, one using a similar polymerization vessel without coating at all and the other using a similar vessel with coating excluding the incorporation of any metal compound. The results are also set out in the Table.

Table I

| Exp. No. | Metal Complex Organic Compound (A) | Metal Compound (B) | (B)/(A) (wt.%) | Aging Time (hrs.) | S.E.P. (mV) | No. of Repeated Runs |
|---|---|---|---|---|---|---|
| 1 | Nigrosine Base | CuCl | 10 | 0.5 | +250 | 15 |
| 2 | " | " | 20 | 0.5 | +300 | 20 |
| 3 | " | " | 50 | 0.5 | +350 | 25 |
| 4 | " | " | 100 | 0.5 | +400 | 30 |
| 5 | " | " | 150 | 0.5 | +400 | 30 |
| 6 | " | " | 10 | 2.0 | +350 | 25 |

Table I-continued

| Exp. No. | Metal Complex Organic Compound (A) | Metal Compound (B) | (B)/(A) (wt.%) | Aging Time (hrs.) | S.E.P. (mV) | No. of Repeated Runs |
|---|---|---|---|---|---|---|
| 7 | " | " | 20 | 2.0 | +400 | 30 |
| 8 | " | " | 50 | 2.0 | +400 | 30 |
| 9 | " | " | 100 | 2.0 | +400 | 30 |
| 10 | " | " | 150 | 2.0 | +400 | 30 |
| 11 | " | " | 10 | 120 | +420 | 30< |
| 12 | " | " | 20 | 120 | +530 | 30< |
| 13 | " | " | 50 | 120 | +500 | 30< |
| 14 | " | " | 100 | 120 | +450 | 30< |
| 15 | " | " | 150 | 120 | +400 | 30 |
| 16 | " | $CuCl_2$ | 20 | 20 | +350 | 25 |
| 17 | " | $NiCl_2$ | 20 | 2.0 | +300 | 20 |
| 18 | " | $CoCl_2$ | 20 | 2.0 | +300 | 20 |
| 19 | " | $AgNO_3$ | 20 | 2.0 | +450 | 30< |
| 20 | " | $H_2(PtCl_4)$ | 20 | 2.0 | +500 | 30< |
| 21* | — | — | — | — | −350 | 0 |
| 22* | Nigrosine Base | — | — | — | −250 | 4 |

*Control.

EXAMPLE 2

The same procedure as described in Example 1 was repeated except that a monomeric mixture composed of 160 kg of vinyl chloride and 40 kg of vinyl acetate was used instead of 200 kg of vinyl chloride monomer, using the various metal complexes as indicated in Table II. The results are set out in the same table.

For comparison, two experiments Nos. 33 and 34 were carried out, each using an organic compound without the incorporation of any metal compound. The results are also set out in the same table.

Table II

| Exp. No. | Metal Complex Organic Compound (A) | Metal Compound (B) | (B)/(A) (wt.%) | Aging Time (hrs.) | S.E.P. (mV) | No. of Repeated Runs |
|---|---|---|---|---|---|---|
| 23 | Spirit Black | $CrCl_3$ | 30 | 2.0 | +400 | 5 |
| 24 | " | $MoCl_2$ | 30 | 2.0 | +400 | 5 |
| 25 | " | CuCl | 30 | 2.0 | +500 | 7 |
| 26 | " | $(CH_3COO)_2Zn$ | 30 | 2.0 | +150 | 2 |
| 27 | " | $FeSO_4$ | 30 | 2.0 | +200 | 2 |
| 28 | Nigrosine Base | $CrCl_3$ | 80 | 48.0 | +350 | 3 |
| 29 | " | $MoCl_2$ | 80 | 48.0 | +350 | 3 |
| 30 | " | CuCl | 80 | 48.0 | +400 | 5 |
| 31 | " | $(CH_3COO)_2Zn$ | 80 | 48.0 | + 50 | 1 |
| 32 | " | $FeSO_4$ | 80 | 48.0 | +100 | 1 |
| 33* | " | — | — | — | −250 | 0 |
| 34* | Spirit Black | — | — | — | 0 | 0 |

*Control.

EXAMPLE 3

The same procedure as described in Example 1 was repeated except that the complexes composed of the various polar organic compounds or organic dyes and metal compounds as indicated in Table III dissolved in an organic solvent (pyridine or ethanol) and aged at 40° C for 2 hours were employed.

For comparison, experiments Nos. 39–42 were carried out, each using a solution of a polar organic compound and/or an organic dye without the incorporation of any metal compound. The results are also set out in the same Table.

Table III

| Exp. No. | Organic Dye (A) and/or Polar Organic Compound (A') | Organic Solvent | Metal Compound (B) | (B)/(A) and/ or (A') (wt. %) | S.E.P. (mV) | No. of Repeated Runs |
| --- | --- | --- | --- | --- | --- | --- |
| 35 | Pyrolle Benzaldehyde | Pyridine | ZnCl$_2$ | 50 | −200 | 5 |
| 36 | Arizaline | " | CaCl$_2$ AlCl$_3$ | 50 | −200 | 5 |
| 37 | Hematein | Ethanol | CrCl$_3$ | 50 | −120 | 8 |
| 38 | 8-Hydroxy-quinoline | " | FeSO$_4$ | 50 | − 50 | 13 |
| 39* | Pyrolle Benzaldehyde | Pyridine | — | — | −290 | 1 |
| 40* | Arizaline | " | — | — | −290 | 1 |
| 41* | Hematein | Ethanol | — | — | −300 | 1 |
| 42* | 8-Hydroxy-quinoline | " | — | — | −280 | 1 |

*Control.

EXAMPLE 4

The same procedure as in Example 1 was repeated except that 2 kg of sodium lauryl sulfate and 2.2 kg of cetyl alcohol were used instead of the partially saponified polyvinyl alcohol, to obtain the results as set out in Table IV.

For comparison, experiment No. 46 was carried out, using the same compound without the incorporation of any metal compound. The results are also set out in the same table.

Table IV

| | Metal Complex | | | | | |
| --- | --- | --- | --- | --- | --- | --- |
| Exp. No. | Organic Compound (A) | Metal Compound (B) | (B)/(A) (wt.%) | Aging Time (hrs.) | S.E.P. (mV) | No. of Repeated Runs |
| 43 | Nigrosine Base | CuCl$_2$ | 20 | 2 | +200 | 10 |
| 44 | " | NiCl$_2$ | 20 | 2 | +150 | 7 |
| 45 | " | CoCl$_2$ | 20 | 2 | +150 | 7 |
| 46* | " | — | — | — | −300 | 0** |

*Control.
**At the first polymerization run, 2 kg of scale deposition was witnessed.

EXAMPLE 5

The same metal complex as used in experiment No. 37 of Example 3 (i.e., CrCl$_3$-hematein complex in ethanol, CrCl$_3$/hematein being 50% by weight) was applied, in an amount of 0.1 g/m$^2$ as solid, over the inner walls of a 5-liter horizontal stainless steel polymerization vessel equipped with a agitator having ribbon bype blades. The inside pressure of the polymerization vessel was reduced to 60 mmHg, and 4 kg of vinyl chloride was charged. Thereupon, 0.1 g of a 25% by weight solution of acetylcyclohexylsulfonyl peroxide in toluene was added, and the temperature was elevated to 60° C. Polymerization was conducted with agitation at a 300 r.p.m. velocity for 1 hour. Then, 1 g of azobisdimethyl-valeronitrile was added to the reaction mixture and polymerization was further continued with agitation at a reduced velocity of 30 r.p.m. for 8 hours. Deposition of scale on the inner walls of the polymerization vessel was not observed at all. Polymerization was repeated 10 times in the same manner as described above. Even after the 10th repetition of the polymerization runs no scale deposition took place.

For comparison, polymerization was repeated in the same manner as described above, in which hematein as the polar organic compound was used instead of the metal complex, to find that scale deposition took place when a 6th repetition of polymerization runs was over. For a further comparison, a similar polymerization reaction was conducted using no polar organic compound, organic dye or metal complex, to find that a large amount of scale deposition occurred at the very first run.

EXAMPLE 6

The same procedure as in Example 1 was repeated with the same metal complex as in experiment No. 1 (i.e., CuCl/Nigrosine Base complex, CuCl/Nigrosine Base being 10% by weight), except only that 50 p.p.m. of the same metal complex was added to the vinyl chloride monomer before the polymerization was initiated. The polymerization runs were repeated for 19 times without the occurrence of polymer scale deposition on the inner walls of the polymerization vessel.

EXAMPLE 7

The same procedure as in Example 1 was repeated with the same metal complex as in experiment No. 1 (i.e., CuCl-Nigrosine Base complex, CuCl/Nigrosine Base being 10% by weight), except only that 0.02% by weight (based on monomer) of NaOH was added to the vinyl chloride monomer before the polymerization was initiated. The polymerization runs were repeated for 27 times without the occurrence of polymer scale deposition on the inner walls of the polymerization vessel.

EXAMPLE 8

The same procedure as in Example 1 was repeated with the same metal complex as in experiment No. 27 of Example 3 (i.e., CrCl$_3$-hematein complex in ethanol, CrCl$_3$/hematein being 50% by weight) except only that 0.02% by weight (based on monomer) of the NaOH was added to the vinyl chloride monomer before the polymerization was initiated. The polymerization runs were repeated for 15 times without the occurrence of polymer scale deposition on the inner walls of the polymerization vessel.

EXAMPLE 9

The same procedure as in Example 1 was repeated except that Nigrosine Base alone was used, not in the form of the complex and that, instead of 500 kg of pure water, 500 kg of water in which 0.07 g of CuCl$_2$ was dissolved was used. The polymerization runs were repeated for 10 times without the occurrence of polymer scale deposition on the inner walls of the polymerization vessel.

EXAMPLE 10

Polymerization runs were carried out in the same manner as described in Example 1 with various metal complexes with polar organic compounds or organic dyes instead of the complexes of Nigrosine Base. The results are set out in Table V together with the results of the control experiments (Nos. 57–66) undertaken to show the effectiveness of the coatings with the respective polar organic compounds or organic dyes alone.

Table V

| Exp. No. | Metal Complex Organic Compound (A) | Metal Compound (B) | (B)/(A) (wt. %) | Aging Time (hrs.) | S.E.P. (mV) | No. of Repeated Runs |
|---|---|---|---|---|---|---|
| 47 | Azobenzene | ZnCl$_2$ | 20 | 0.5 | −260 | 2 |
| 48 | Methylene Blue | AgNO$_3$ | 20 | 0.5 | −200 | 5 |
| 49 | α-Naphthylamine | CuCl | 20 | 0.5 | −210 | 4 |
| 50 | Anthraquinone | AlCl$_3$ | 20 | 0.5 | −200 | 5 |
| 51 | Acrydine Orange | FeCl$_2$ | 20 | 0.5 | −190 | 7 |
| 52 | Naphthoquinone | MoCl$_4$ | 20 | 0.5 | −270 | 3 |
| 53 | Polyethyleneimine | FeSO$_4$ | 20 | 0.5 | −290 | 3 |
| 54 | Polyacrylamide | NiCl$_2$ | 20 | 0.5 | −210 | 4 |
| 55 | Oil Black HBB | CrCl$_3$ | 20 | 0.5 | −180 | 8 |
| 56 | Phenylenediamine | H$_2$[PtCl$_4$] | 20 | 0.5 | −200 | 4 |
| 57* | Azobenzene | — | — | — | −330 | 0 |
| 58* | Methylene Blue | — | — | — | −300 | 1 |
| 59* | α-Naphthylamine | — | — | — | −310 | 1 |
| 60* | Anthraquinone | — | — | — | −290 | 1 |
| 61* | Acrydine Orange | — | — | — | −280 | 2 |
| 62* | Naphthoquinone | — | — | — | −300 | 1 |
| 63* | Polyethyleneimine | — | — | — | −280 | 1 |
| 64* | Polyacrylamide | — | — | — | −280 | 1 |
| 65* | Oil Black HBB | — | — | — | −260 | 2 |
| 66* | Phenylenediamine | — | — | — | −280 | 2 |

*Control.

EXAMPLE 11

Several runs of copolymerization of vinyl chloride and vinyl acetate were carried out in the same manner as described in Example 2 with various metal complexes. The results are set out in Table VI together with the results of the control experiments (No. 73–78) undertaken to show the effectiveness of the coatings with the respective polar organic compounds alone.

Table VI

| Exp. No. | Metal Complex Organic Compound (A) | Metal Compound (B) | (B)/(A) (wt. %) | Aging Time (hrs.) | S.E.P. (mV) | No. of Repeated Runs |
|---|---|---|---|---|---|---|
| 67 | Vitamin B$_2$ | CuCl | 30 | 2.0 | −320 | 1 |
| 68 | Chlorophyl | " | 30 | 2.0 | −320 | 1 |
| 69 | Benzopurpurine 4B | " | 30 | 2.0 | −310 | 1 |
| 70 | Fluorecen | NiCl$_2$ | 30 | 2.0 | −300 | 1 |
| 71 | Diaminonaphthaline | " | 30 | 2.0 | −250 | 2 |
| 72 | Orthophenantroline | " | 30 | 2.0 | −290 | 1 |
| 73* | Vitamin B$_2$ | — | — | — | −350 | 0 |
| 74* | Chlorophyl | — | — | — | −350 | 0 |
| 75* | Benzopurpurine 4B | — | — | — | −340 | 0 |
| 76* | Fluorecen | — | — | — | −340 | 0 |
| 77* | Diaminonaphthaline | — | — | — | −330 | 0 |
| 78* | Grthophenantroline | — | — | — | −330 | 0 |

*Control.

EXAMPLE 12

The inside walls of a 1,000-liter polymerization vessel were coated with a 0.5% by weight solution in toluene-methanol mixed solvent of a compound shown in Table VII followed by drying. Then, 800 liters of a water solution containing 1 kg of a metal salt shown in the table was charged into the vessel and heated at 90° C for 30 minutes. After discharging of the salt solution from the vessel, were charged 200 kg of vinyl chloride monomer, 500 kg of water, 100 g of diisopropylperoxydicarbonate, 200 g of hydroxypropylmethylcellulose, 2 kg of calcium stearate, 3 kg of rice wax, 1.4 kg of octyltin mercaptide and 200 g of polyethylene wax into the thus treated polymerization vessel and polymerization was carried out at 50° C for 8 hours with the agitator driven at 160 r.p.m. After completion of each of the polymerization runs, the amount of scale deposition was examined to give the results mentioned in the table, together with the results of the control experiments in which the treatment with the salt solution was omitted.

Table VII

| Exp. No. | Organic compound or dye | Metal Compound | Amount of Scale, g/m$^2$ |
|---|---|---|---|
| 79 | Spirit Black | FeCl$_3$ | 0 |
| 80 | Nigrosine Base | FeSO$_4$ | 0 |
| 81 | Diaminonaphthalene | NiCl$_2$ | 0 |
| 82* | Nigrosine Base | — | 290 |
| 83* | Diaminonaphthalene | — | 330 |

*Control.

What is claimed is:

1. Method of polymerization of a vinyl chloride monomer or a monomeric mixture composed mainly of vinyl chloride in the presence of a polymerization initiator which comprises placing said mixture into a polymerization vessel fitted with an agitator and other attachments and having inner walls of metal, forming layers of a metal complex with a polar organic compound or an organic dye on the inner walls of the polymerization vessel and the surfaces of the agitator and other attachments coming into contact with the monomer of monomeric mixture, said metal complex being formed by mixing said polar organic compound or organic dye with a metal compound in a ratio ranging from 100:5 to 100:300 by weight, and said complex being used in the form of a solution in an organic solvent to form said layers, subject to subsequent drying.

2. The method as claimed in claim 1 wherein said polar organic compound is at least one selected from the group consisting of nitrogen-containing organic compounds, sulfur-containing organic compounds and oxygen-containing organic compounds.

3. The method as claimed in claim 2 wherein said nitrogen-containing organic compound is at least one selected from the group consisting of compounds having an azo, nitro, nitroso or azomethine group or an azine ring, and amine, amide and nitrile compounds.

4. The method as claimed in claim 2 wherein said nitrogen-containing organic compound is at least one selected from the group consisting of azomethane, azobenzene, nitrobenzene, nitrosobenzene, monoaminomono-nitroazobenezene, pyrazine, pyridine, pyrrole, chlorophyl, thiazine, oxazine, morpholine, quinoline, aniline, benzal aniline, EDTA, α-naphythyl amine, ethanol amine, diethanol amine, phenylenediamine, acetamide, dimethylformamide, acetonitrile, orthophenanthroline, Methylene Blue, Nigrosine, Nigrosine Base, Oil Black, Spirit Black, vitamin $B_2$, polyethyleneimine, polyamide, polyacrylamide, polyacrylonitrile and polyurethane.

5. The method as claimed in claim 2 wherein said sulfur-containing organic compound is at least one selected from the group consisting of compounds having a thiocarbonyl, thioether or thiol group.

6. The method as claimed in claim 2 wherein said sulfur-containing organic compound is at least one selected from the group consisting of thioglycolic acid, thiourea, thiocarbanilic acid, thiocarbamic acid, thiobenzoic acid, diethyl sulfide, ethylmethyl sulfide, propyl mercaptan, butyl mercaptan, polysulfide and polysulfone.

7. The method as claimed in claim 2 wherein said oxygen-containing organic compounds is at least one selected from the group consisting of quinones, ketones, aldehydes, alcohols, esters, carboxylic acids, sulfoxides and oximes.

8. The method as claimed in claim 2 wherein said oxygen-containing organic compound is at least one selected from the group consisting of p-benzoquinone, anthraquinone, benzophenone, acetophenone, diisopropyl ketone, formaldehyde, acetaldehyde, benzaldehyde, octyl alcohol, cetyl alcohol, benzyl alcohol, phenol, cresol, hematein, fluorescein, diisopropyl ether, diphenyl ether, amylacetate, ethyl benzoate, stearic acid, benzoic acid, salicyclic acid, diethyl sulfoxide, formaldoxime, polyacetal, polyacrylic acid and polyvinyl alcohol.

9. The method as claimed in claim 1 wherein said organic dye is at least one selected from the group consisting of azo dyes, anthraquinone dyes, indigo dyes, sulfide dyes, phthalocyanine dyes, diphenylmethane dyes, triphenylmethane dyes, xanthene dyes, acridine dyes, nitro dyes, nitroso dyes, thiazole dyes, azine dyes, oxazine dyes, thiazine dyes, benzoquinone dyes, naphthoquinone dyes and cyanine dyes.

10. The method as claimed in claim 1 wherein said polymerization is suspension or emulsion polymerization.

11. The method as claimed in claim 1 wherein said polymerization is bulk polymerization.

12. The method as claimed in claim 10 wherein said suspension or emulsion polymerization is carried out in an alkaline medium.

13. The method as claimed in claim 1 wherein said monomeric mixture is composed of mainly of vinyl chloride and one or more monomers selected from the group consisting of vinyl esters, vinyl ethers, acrylonitrile, acrylic and methacrylic acids, esters thereof, maleic and fumaric acids, esters thereof, maleic anhydride, aromatic vinyl compounds, vinylidene halides and olefins.

14. The method as claimed in claim 1, wherein said ratio is in the range of from 100:00 to 100:150 by weight.

15. The method as claimed in claim 1, wherein said metal complex as formed is subjected to aging over a period of 10 minutes or more.

16. The method as claimed in claim 1, wherein the amount of said metal complex used to form said layers is from 0.001 to 100 $g/m^2$.

17. The method as claimed in claim 16, wherein said amount is from 0.01 to 50 $g/m^2$.

18. The method as claimed in claim 1, wherein said layer is formed on surfaces in situ by applying said polar organic compound or organic dye over the surfaces and then bringing the same surfaces into contact with a metal compound.

19. The method as claimed in claim 1, wherein said metal compound is at least one selected from the group consisting of Cu, Ag, Au, Zn, Cd, Hg, Y, lanthanoid elements, Al, Ti, Zr, Hf, Sn, Pb, V, Nb, Ta, Cr, Mo, W, Mn, Fe, Co, Ni, Rh, Pd, Ir and Pt in the form of chlorides, sulfates, nitrates and acetates.

20. The method as claimed in claim 1, wherein said metal complex is separately added to said monomer or monomeric mixture in an amount not exceeding 100 p.p.m. based on the weight of monomer or monomeric mixture.

* * * * *